United States Patent [19]
Okey

[11] 3,921,203
[45] Nov. 18, 1975

[54] TRISEQUENTIAL COLOR VIDEO RECORD-PLAYBACK METHOD AND CIRCUITS

[75] Inventor: Bernard J. Okey, Claygate, England

[73] Assignee: BASF Aktiengesellschaft, Ludwigshafen (Rhine), Germany

[22] Filed: May 24, 1974

[21] Appl. No.: 473,221

[52] U.S. Cl. .......... 358/9
[51] Int. Cl.[2] .......... H04N 1/22; H04N 9/32
[58] Field of Search .......... 358/9, 11, 4

[56] References Cited

UNITED STATES PATENTS

| | | | |
|---|---|---|---|
| 3,560,635 | 2/1971 | Bruch | 358/9 |
| 3,786,178 | 1/1974 | Scholz | 358/4 |

FOREIGN PATENTS OR APPLICATIONS

| | | | |
|---|---|---|---|
| 1,935,213 | 1/1971 | Germany | 358/4 |

*Primary Examiner*—George H. Libman

[57] ABSTRACT

A method and circuits for demodulating color video signals into trisequential form for recording and to recombine the trisequential signals into composite color video signals, using substantially the same method and circuit elements for both demodulation and recombination, where the demodulated trisequential signals have respectively the same phases as the phases of the received chrominance signals.

10 Claims, 4 Drawing Figures

TRISEQUENTIAL COLOR VIDEO RECORD-PLAYBACK METHOD AND CIRCUITS

BACKGROUND OF THE INVENTION

1. Field of the Invention

The invention relates to a method and circuits for recording and subsequent playback of color video signals. More particularly, the invention relates to a method and circuits whereby National Television Systems Committee (NTSC) or Phase Alternate Lines (PAL) broadcast signals are converted into trisequential form for recording upon suitable recording medium, specifically magnetic tape. Upon playback the trisequentially recorded signal is recombined into a standard NTSC or PAL video color signal.

2. Description of Prior Art

It is well known that various colors can be produced by the combination of the three colors red, green and blue in the proper relationship. Color video information, or chrominance signals, is broadcast by imposing upon a black and white television signal a modulated subcarrier. The NTSC system uses a 3.58 mHz subcarrier for color transmission, while PAL uses 4.43 mHz.

In video recording there is always present the problem of how to record the color subcarriers. These subcarriers are high frequency; they often have large amplitudes; and their recording and subsequent playback must not introduce phase errors, which result in color changes. Recording of color subcarriers is especially a problem in home video recorders since they are typically designed with limited bandwidth to reduce production costs. Many such video recorders remove the subcarrier with its chroma information, heterodyne it down to 500 kHz, and record this signal on tape. Two recording channels are used; one is the heterodyned color information and the other is the $Y_H$ signal. In such a system, the color information is recorded as an amplitude modulated signal without frequency modulation. The composite video signal is represented by Y which is composed of $Y_L$ plus $Y_H$, where $Y_H$ is the high frequency black and white or luminance information, and $Y_L$ is the low frequency luminance information. $Y_L$ can be represented by the equation $Y_L=rR+gG+bB$, where R,G and B are the color vectors red, green and blue, and $r$,$g$ and $b$ represent the amplitude or color saturation of the vectors. The color difference signals R-Y, G-Y, and B-Y (see FIG. 4) are normally demodulated in video receivers because of the simplicity of generating the necessary color voltage for the Kinescope by simply adding the Y signal to each of the color difference signals.

Prior art systems of the kind just mentioned, which use heterodyning-down of the color subcarrier, are deficient from the standpoint of color lock stability and bandwidth on playback--keeping in mind that the recovered color subcarrier must represent the original signal very accurately as to frequency and phase so that proper demodulation in the TV receiver is insured.

Line sequential color television systems are known wherein the NTSC color difference signals are demodulated according to the phase angle of their subcarriers in a predetermined relationship to the phase angle of the color burst synchronization signal included in the video signal transmitted by the TV station. In this regard, see, for example, German Telefunken patent 1,256,686. For this demodulation process the use of two or three demodulators is necessary. After demodulation, the color difference signals are filtered by means of two or more filters and, by means of a sequential switch, are converted into line sequential color difference signals. Thereafter, these color difference signals are added to the luminance signal, which includes low and high frequencies, so that the real color signals plus the $Y_H$ luminance signal are prepared for sequential recording on a tape or disk. During playback recombination of the video signal is accomplished by a modulator, in place of the demodulators, and one or more delay lines for composing the modulated chrominance and luminance signals. This known method does not suggest the possibility of trisequential recording or playback of video signals.

SUMMARY OF THE INVENTION

Using the method and circuits described herein, the color subcarrier of the color video signal is not recorded. Instead, demodulation of the NTSC or PAL chroma signals into trisequential form and recombination of the trisequential signals to produce NTSC and PAL signals is accomplished by generating a three phase color subcarrier having the three phases of the received chroma signals; and switching the three phases of the subcarrier line sequentially into an AM synchronous demodulator to produce sequentially demodulated color difference signals; and adding the sequentially demodulated color difference signals with the Y signal to produce trisequential video signals each consisting of one chroma signal and the luminance, or $Y_H$, signal of each line scan. This information is recorded. During playback, the recorded information is recombined in an AM modulator with the corresponding three phases of the color subcarriers, which are line sequentially switched into the modulator. The output of the modulator is recombined into an NTSC or PAL signal by presenting the output to a delay line system and trisequentially switching the signals at selected points of the delay line system into an output matrix demodulator system which produces the NTSC or PAL signal at its output.

It is an object of the invention to provide a method and circuits to improve the recording and/or playback of trisequential video signals.

A second object is to use a single circuit for generating the phases of a subcarrier at proper phase angle for performing the demodulation of modulation of the color difference signals.

It is a further object of the invention to use the above single circuit for both recording and playback processes.

An additional object is the development of a system which has the advantage of using only one demodulator for demodulation of the three color difference signals.

Another object of the invention is the development of a circuit which may be produced at the lowest cost.

Additional objects will be apparent to those skilled in the art upon consideration of the complete specification.

DESCRIPTION OF THE PREFERRED EMBODIMENT

Figure 1:
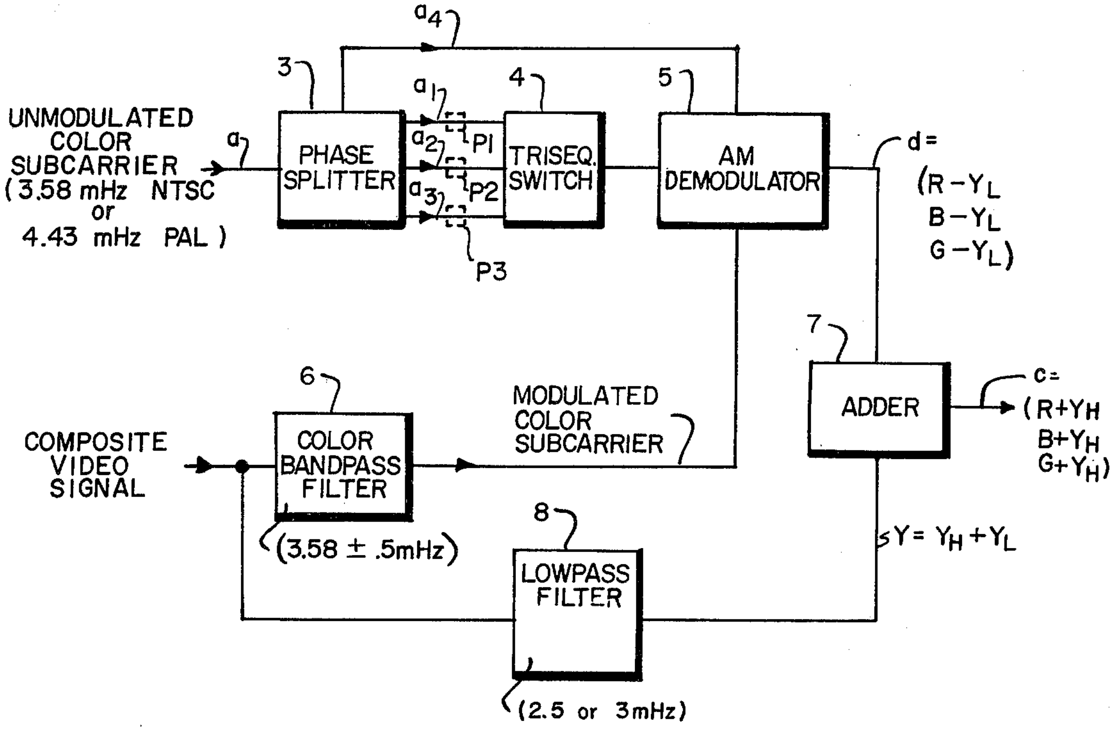
FIG. 1 is a block diagram of the circuit used in recording of the video signals.
Figure 3:
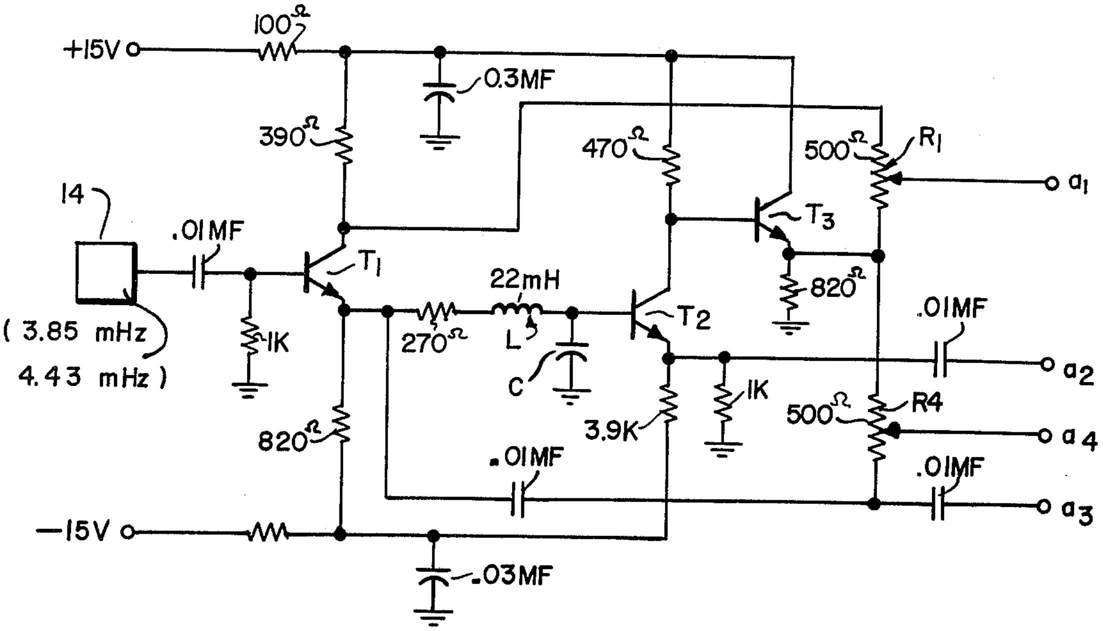
FIG. 3 discloses an embodiment of the phase splitter or trisequential phase generator shown in FIGS. 1 and 2.

Block diagram of the recording circuit, FIG. 1, includes stages 3 to 8, wherein the stages are a phase splitter 3, a trisequential switch 4, a demodulator 5, a bandpass filter 6, an adder 7 and a lowpass filter 8. The entrance signal a of stage 3 is a standard unmodulated color subcarrier of 3.58 mHz for NTSC and 4.43 mHz for PAL. The subcarrier is generated by a stabilized oscillator not shown in FIG. 1 but indicated in FIG. 3. The phase of the subcarrier is split by means of phase splitter 3 which can be a phase shifting stage as shown in FIG. 3. Subcarriers $a_1$, $a_2$, and $a_3$ are presented to the trisequential switch 4. Subcarrier $a_4$ is directly fed to the AM demodulator 5. The phase angles of subcarriers $a_1$, $a_2$, and $a_3$ are equal to the phase angles of the original color signals (red, 103°; green, 241°; and blue, 348° for NTSC and also for PAL during the time the color difference signal R-Y is not reversed). Accordingly, the subcarriers $a_1$, $a_2$, and $a_3$ have phase angles of 103°, 241°, and 348° respectively. Subcarrier $a_4$, the purpose of which will be explained hereinafter, should have a phase angle of approximately 45° and an amplitude of approximately one third of the amplitude of the color signals.

The composite video signal is fed to lowpass filter 8, which should have an upper frequency limit of about 2.5 to 3 mHz to separate chrominance from luminance. The luminance signal Y is fed directly to adder 7. Bandpass filter 6 transmits only the chroma subcarrier signal to demodulator 5 where it is demodulated into the trisequential color difference signals R-$Y_L$, G-$Y_L$, and B-$Y_L$ at demodulator 5 output *d*. These trisequential color difference signals are added to Y in 7 to yield the trisequential signals R+$Y_H$, G+$Y_H$, and B+$Y_H$; therefore, information is recorded sequentially which includes one color plus the luminance signal.

The recording circuit in FIG. 1 has the following function: color difference signals (R-$Y_L$, G-$Y_L$, and B-$Y_L$) are demodulated by demodulator 5, which consists of, for example, a rectifier circuit of four diodes. During the demodulation process, the subcarriers $a_1$, $a_2$, and $a_3$ are sequentially switched to the input of demodulator 5 by the switch means 4, which is controlled by the horizontal synchronizing pulses normally transmitted in the video signal. The synchronizing pulses should be separated from the Y signals before they enter filter 6. By the controlled switching operation of switch 4, signal R-$Y_L$ is only demodulated in the direction of the vector of the color signal red. This vector has a phase angle of 103° as above mentioned. By the above example, the demodulation process of the other signals, i.e. G-$Y_L$ and B-$Y_L$ will be clear also. Because the phase angles of the color difference signals differ from the included color signals, any phase error results in a demodulation error occurring as hue or tint error and as a decrease in luminance. According to the NTSC standard, the R-Y signal has a phase angle of 90°. If as above described, the R-$Y_L$ signal would be demodulated in the direction of subcarrier $a_1$, the phase error of 13° will occur. For the correction of such a phase error, subcarrier $a_4$ is used. The function of this subcarrier is shown in the vector diagram of FIG. 4. Because subcarrier $a_4$ is always introduced into demodulator 5, phase errors and demodulation errors as above described are optimally correctable.

Figure 4:
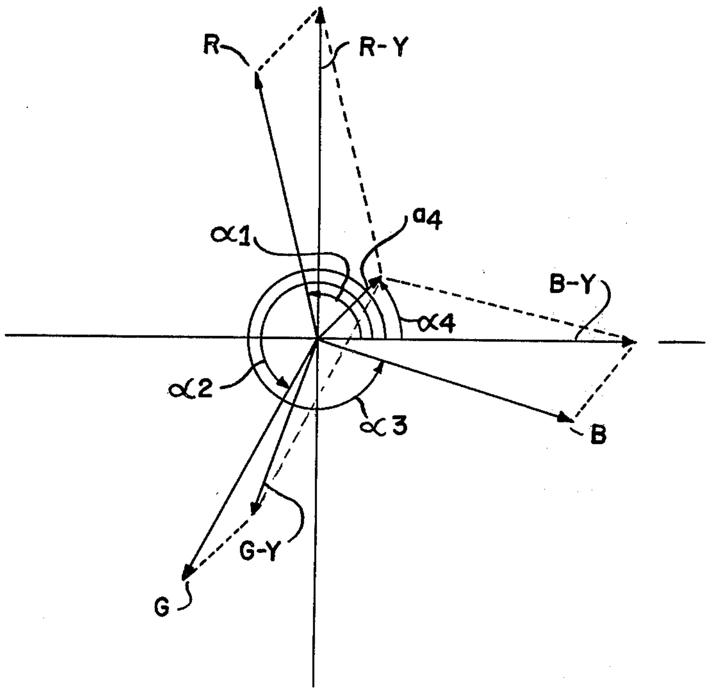
FIG. 4 shows a vector diagram of the color and color difference signals in their respective phase relationship.

FIG. 4 is a phase diagram of the signals involved, and shows in principle the function of the fourth phase subcarrier $a_4$ having the phase angle $\alpha_4$ of about 45° and an amplitude of 0.318 of the amplitude of the vectors R, G and B. The amplitudes of the color difference signals, R-Y, G-Y, and B-Y, must be diminished by a not shown limiter to equalize the three amplitudes. It will be clear from the vector diagram that by dimensioning of the vector $a_4$ the phase errors arising from the phase angle differences between the color vectors and the color difference vectors can be advantageously compensated for in a simple manner.

The fourth phase subcarrier $a_4$ is only necessary for use in FIG. 1 record circuit. It is, however, also possible, instead, to insert an individual phase shifter in each of the outgoing lines between stages 3 and 4. The phase shifters are shown by dotted lines and indicated as $P_1$, $P_2$, and $P_3$. The phase shifting angles of stages $P_1$, $P_2$, and $P_3$ are minus 13°, plus 7°, and plus 12°, and thus cause the phases of the color signals red, green and blue to be shifted by a corresponding amount. It is obvious to those skilled in the art, that the use of the foregoing described fourth phase subcarrier $a_4$ is a simple and inexpensive solution to the phase error problem. By the use of the $a_4$ subcarrier, a very small phase error remains, but it is negligible in regard to the phase error of the entire system, which is about 2%.

Figure 2:
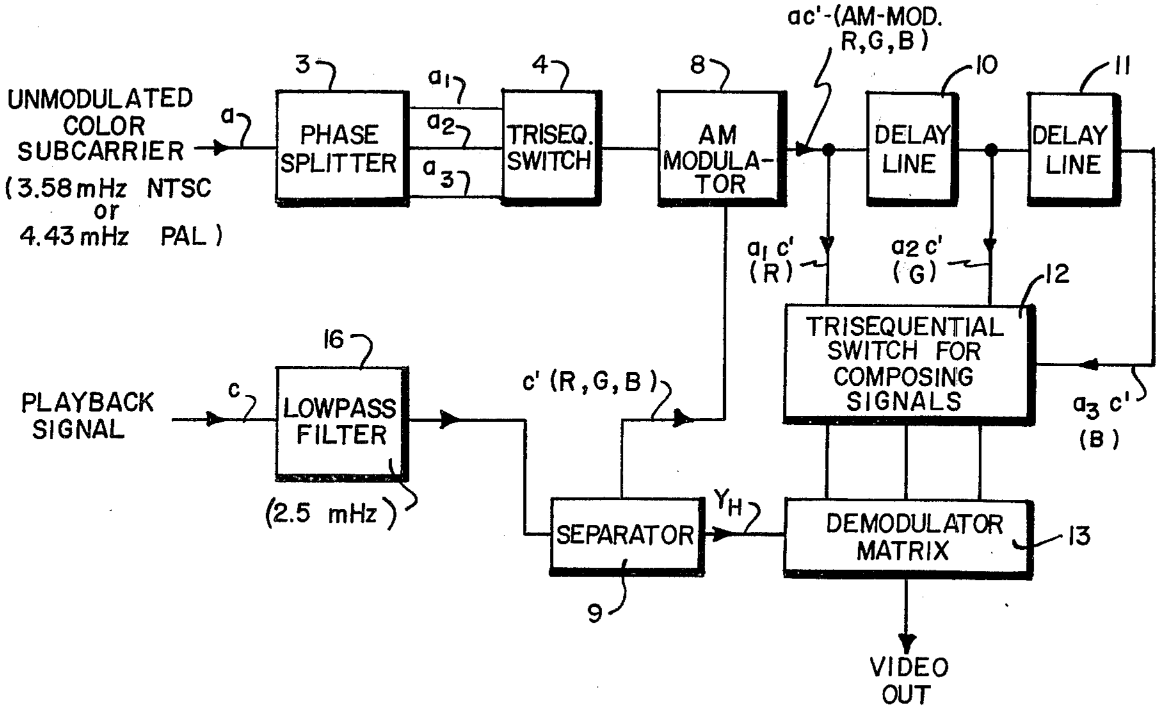
FIG. 2 is a block diagram of the circuit used in playback of video signals.

The playback circuit, according to FIG. 2, includes stages 3, 4 and 16, and in addition, an AM modulator 8, delay lines 10 and 11, a second trisequential switch 12, and a demodulator matrix 13. Signals *c*, which were previously recorded, are introduced at the input of filter 16. The outgoing signal from filter 16 has the same form as the incoming signal *c* because only frequencies higher than 2.5 mHz are separated by filter 16. Stage 9 accomplishes the separation of the $Y_H$ signal portion from the filtered playback signal. The remaining portion $c'$ of the last-mentioned signal is introduced into the AM modulator 8, which is connected to switch means 4 as above described for FIG. 1. Signals $c'$ are the R, G and B color information because the $Y_H$ portion has been separated in signal separator 9. Modulator 8 produces signals $ac'$ in the same way as previously described, except that neither the fourth phase subcarrier nor the three-phase shifters previously disclosed are necessary. This is because the color signals $c'$ have the same phase angles as the subcarriers $a_1$, $a_2$, and $a_3$.

For composition into the standard NTSC or PAL signal format, signals $ac'$, which are the AM modulated signals $c'$, remain undelayed or are delayed for one or two line periods by delay lines 10 and 11 to yield signals $a_1c'$, $a_2c'$, and $a_3c'$. These signals, which are equal to the AM-modulated color signals R, G and B, respectively are then switched by trisequential switch means 12 for composing the three AM-modulated color signals in time. Demodulator matrix 13 includes the demodulators for AM demodulation of the color signals and matrix devices for composing the chroma and luminance parts of the video signal. This video signal, containing the demodulated chrominance information and also luminance information, can then be transmitted to, for example, a video receiver.

FIG. 3 shows an embodiment of phase splitter 3 utilized in FIGS. 1 and 2. The circuit consists of transistor stages $T_1$, $T_2$ and $T_3$. Transistor stages $T_1$ and $T_2$ are normal amplifier stages, and the transistor stage $T_3$ functions to prevent interaction between the collectors of $T_1$ and $T_2$. Therefore, the transistor stage $T_3$ is an emitter follower circuit with very little output impedance. A generator 14, for example, a quartz crystal oscillator, generates the standard color subcarrier frequency of 3.58 mHz for NTSC or 4.43 mHz for PAL. Generator 14 is connected to the base of $T_1$ from the emitter of which subcarrier $a_3$ is derived. The phase of $a_3$ in this circuit is used as a reference. The phase of the subcarrier $a_2$ is derived from the emitter of transistor $T_2$ which has a phase shifting circuit consisting of an inductance L and a capacitance C in its input circuit. The values of L and C are so chosen that a phase shift of, theoretically, 348°–241°=107°, occurs between $a_2$ and $a_3$.

Phases $a_1$ and $a_4$ are derived by a variable matrix arrangement involving potentiometers $R_1$ and $R_4$. It will be noted from FIG. 3 that due to the 180° phase inversion at the collector of transistor $T_1$ with respect to the emitter of $T_1$ there exists at the top of potentiometer $R_1$ a blue-related reference phase of 348°–180°=+168°, and that due to the 180° phase inversion at the collector of transistor $T_2$ (and the emitter of transistor $T_3$) with respect to the emitter of $T_2$, there exists at the bottom of potentiometer $R_1$ and green-related reference phase of 241°–180°=+61°. Therefore, as the slider of $R_1$ is moved from the bottom to the top of $R_1$, as viewed in FIG. 3, the phase at this slider will change from +61° to +168°, passing through the red phase of +103°. The aforementioned greenrelated reference phase of 61° also exists at the top of potentiometer $R_4$ while the bottom of this potentiometer is at the blue phase of +348° or −16°. Thus, as the slider of $R_4$ is moved from the bottom to the top of $R_4$, the phase of this slider will pass through the +45° phase of subcarrier $a_4$. The described circuit is to be seen only as an example of a phase splitter circuit which can be suitably utilized by those skilled in the art.

In the description of the circuits in FIGS. 1 and 2, each of the circuits has been described separately because the functions of the circuits are different. However, an important advantage of these circuits is the fact that stages 3 and 4 can be used for the recording process as well as for the playback process. If such a combination of circuits is used, the construction of which is obvious from the foregoing, switch means are necessary whereby the fourth phase subcarrier is disconnected from the modulator 5 during the playback process.

The embodiments have been described in reference to the recording and playback of video signals; however, it is obvious to those skilled in the art that this system has utility for the separation of any multi-phase signal which utilizes a subcarrier of a given frequency. It is not intended, by the description herein, to limit the invention to the disclosed embodiments.

We claim:

1. A method for demodulation of chrominance signals into trisequential form and for recombination of the trisequential signals comprising.

a. generating a three phase color subcarrier having the three phases of the received chrominance signals;

b. switching line sequentially the three phases of the subcarrier into an AM demodulator which produces three sequentially demodulated color difference signals;

c. converting the three color difference signals into trisequential video signals, each consisting of one color signal and a luminance signal of high frequency during each line scan; and d. recombining the trisequential video signals into a video signal of standard format.

2. A method as in claim 1, where the trisequential video signals are recombined into a standard PAL video signal.

3. A method for recombination of trisequentially recorded signals comprising:

a. separating the luminance portion of the recorded signal from the total trisequentially recorded signal which consists of a chrominance and luminance portion;

b. generating a three phase color subcarrier having the three phases of the recorded chrominance signals.

c. switching line sequentially the three phases of the subcarrier into an AM modulator;

d. combining, in the AM modulator, the three phases of the subcarrier with the chrominance signal;

e. passing the combined signal from the AM modulator into a delay line which delays the combined sequential signals one or more line scan durations;

f. composing the combined sequential signals and the luminance portion to produce a video signal of standard format.

4. A method as in claim 3, wherein step (f) comprises: composing the combined sequential signals and the luminance portion to produce a standard PAL video signal.

5. A method for demodulation of chrominance signals in trisequential form comprising:

a. generating a four phase color subcarrier, three phases of which are equal to the three phases of the received color signals, the fourth phase being a correction phase for correction of the phase difference between the phases of each color difference signal and the phases of each respective color signal;

b. switching the three phases of the subcarrier into an AM demodulator which produces sequential demodulated color difference signals, the fourth phase subcarrier being continuously introduced into the demodulator; and c. converting the color difference signals into trisequential video signals each consisting of one color signal and a luminance signal of high frequency during each line scan.

6. A circuit for demodulation of color video signals into a trisequential form comprising:

a. a phase splitter for splitting an incoming standard color subcarrier frequency into at least a three phase color subcarrier having the three phases of the received color signals;

b. an AM demodulator;

c. means for switching the subcarriers from the phase splitter sequentially into an AM demodulator which produces sequential demodulated color difference signals; and d. means for converting the demodulated color difference signals into sequential signals consisting of one chrominance signal and a luminance signal during each line scan.

7. A circuit for modulation of trisequential video signals into color video signals comprising:

a. a phase splitter for splitting an incoming standard color subcarrier frequency into at least a three phase color subcarrier having the three phases of the received color signals;

b. an AM modulator;

c. means for switching the subcarriers from the phase splitter line sequentially into the AM modulator which produces sequential AM modulated color signals;

d. means for sequentially switching the AM modulated color signals; and e. means for converting said AM modulated color signals into of standard format video signals.

8. A circuit as in claim 7, wherein step (e) comprises means for converting said AM modulated color signals into standard PAL video signals.

9. A circuit for demodulation of chrominance signals into trisequential form and for remodulation to a standard broadcast video signal comprising:

a. a phase splitter for splitting an incoming standard color subcarrrier frequency into at least a three phase color subcarrier having at least the three phases of the received color signals;

b. an AM demodulator;

c. an AM modulator;

d. means for line sequential switching the subcarrier from the phase splitter into the AM demodulator in recording and into the AM modulator in playback;

e. means for converting the demodulated color difference into trisequential video signals, each consisting of one chrominance signal and the luminance signal during each line scan;

f. means for delaying the signals at least one line scan time;

g. means for line sequentially switching the delayed signals; and h. means for converting the modulated color signals into standard broadcast video signals.

10. A circuit as in claim 9, where the means for converting the modulated color signals consists of a demodulator and a matrix.

* * * * *